(12) United States Patent
Mak

(10) Patent No.: US 8,661,820 B2
(45) Date of Patent: Mar. 4, 2014

(54) LNG REGASIFICATION AND POWER GENERATION

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1078 days.

(21) Appl. No.: 12/598,810

(22) PCT Filed: May 30, 2008

(86) PCT No.: PCT/US2008/006859
§ 371 (c)(1),
(2), (4) Date: Jan. 22, 2010

(87) PCT Pub. No.: WO2008/150450
PCT Pub. Date: Dec. 11, 2008

(65) Prior Publication Data
US 2010/0146971 A1 Jun. 17, 2010

Related U.S. Application Data

(60) Provisional application No. 60/940,787, filed on May 30, 2007.

(51) Int. Cl.
*F01K 25/08* (2006.01)
*F01K 7/34* (2006.01)
(52) U.S. Cl.
USPC .................. 60/651; 60/653; 60/671; 60/678; 60/679

(58) Field of Classification Search
USPC ............................ 60/651, 653, 671, 677–679
See application file for complete search history.

(56) References Cited

U.S. PATENT DOCUMENTS

| 4,036,028 | A | 7/1977 | Mandrin |
| 4,231,226 | A | 11/1980 | Griepentrog |
| 4,388,092 | A | 6/1983 | Matsumoto et al. |
| 5,394,686 | A | 3/1995 | Child et al. |
| 5,457,951 | A | 10/1995 | Johnson et al. |
| 6,367,258 | B1 | 4/2002 | Wen et al. |
| 7,266,976 | B2 * | 9/2007 | Eaton et al. ................. 62/612 |
| 7,493,763 | B2 * | 2/2009 | Klochko et al. ............ 60/641.7 |
| 2002/0092305 | A1 | 7/2002 | Guillard |
| 2006/0236699 | A1 * | 10/2006 | Klochko et al. ............ 60/671 |

FOREIGN PATENT DOCUMENTS

| EP | 496283 | 7/1992 |
| WO | 2004/109180 | 12/2004 |
| WO | 2004/109206 | 12/2004 |

* cited by examiner

*Primary Examiner* — Hoang Nguyen
(74) *Attorney, Agent, or Firm* — Fish & Associates, PC

(57) ABSTRACT

LNG is regasified with concurrent power production in systems and methods where the refrigeration content of the LNG condenses a low pressure working fluid vapor and in which the combined refrigeration content of the warmed LNG and low pressure working fluid condensate condenses an intermediate pressure working fluid vapor.

15 Claims, 2 Drawing Sheets

LNG REGASIFICATION AND POWER GENERATION

This application claims priority to our U.S. provisional application with the Ser. No. 60/940,787, which was filed May 30, 2007.

FIELD OF THE INVENTION

The field of the invention is regasification of liquefied natural gas (LNG), especially with concurrent power production.

BACKGROUND OF THE INVENTION

Regasification of LNG requires significant quantities of thermal energy, and typical LNG regasification facilities employ external heat sources to vaporize LNG prior to delivery of the gas to existing pipeline networks. For example, external heat sources include sea water, combustion exhaust, waste heat from power generation, and ambient air. Depending on the particular heat source, the LNG vaporizers may be configured as an open rack seawater vaporizer, a submerged combustion vaporizer, an intermediate fluid vaporizer (e.g., using a glycol-water mixture), or as an ambient air vaporizer. Furthermore, LNG regasification also requires a reliable power supply to operate LNG pumps and compressors for delivery of vaporized LNG product to the pipelines.

More recently, the refrigeration content of LNG is also employed as a heat sink in power generation. For example, power plants may be coupled with LNG regasification, as described in U.S. Pat. Nos. 4,036,028 and 4,231,226 where waste heat from gas turbine exhaust or a thermal power engine is used to vaporize LNG either directly or indirectly (i.e., with or without the use of a heat transfer fluid). Similar configurations are shown in U.S. Pat. No. 6,367,258 where the efficiency of a combined cycle generation plant is increased by integrating LNG vaporization via a heat transfer fluid, which also removes heat from the air intake of a gas turbine to further boost power production. Such configurations are often energy efficient, but generally require integration with an existing power production plant and/or other high-heat source. Similarly, as taught in EP 0 496 283, power is generated by a steam expansion turbine that is driven by a working fluid (here: water) that is heated by a gas turbine exhaust and cooled by a LNG regasification circuit. While such a configuration increases efficiency of a plant to some degree, several problems remain. For example, the utilization of the cryogenic refrigeration content of the LNG is often limited due to the relatively high freezing point of the heat transfer medium. To overcome such difficulties, non-aqueous fluids may be employed as a working fluid in Rankine cycle power generation, which is exemplified in U.S. Pat. No. 4,388,092. Here, a multi-component hydrocarbon fluid is used as working fluid whose composition is altered via distillation to maximize generation efficiency. However, operation and control of such multi-component system is complex, difficult, and often impractical. Similarly, a closed power cycle generation scheme may be employed as described in WO 2006/111957 in which LNG is vaporized using a heat transfer fluid. However, these configurations typically require high circulation rates of the heat transfer fluid and further require a heater to boost the temperature of the vaporized LNG to pipeline specification. Therefore, while some of the known configurations improve efficiency of power generation to some extent, the gain in efficiency is often marginal and rarely justifies the process complexities of such configurations.

Nevertheless, use of LNG refrigeration content as a heat sink in power generation is quite desirable as a typical 500 MMscfd LNG regasification terminal consumes about 10,000 kW that must otherwise be supplied from the external power grid. Where such power source is unreliable, the terminal will also include an internal power plant, which often produces undesirable amounts of waste streams, emissions, and green house gases. Thus, and particularly in an offshore or remote location without reliable power source, operation of an LNG regasification terminal becomes difficult, or even impossible.

Therefore, while various processes and configurations for power generation utilizing LNG as heat sink in regasification are known in the art, all or almost all of them suffer from one or more disadvantages. Thus, there is still a need to provide improved power generation schemes for LNG regasification plants.

SUMMARY OF THE INVENTION

The present invention is directed to configurations and methods of regasification of LNG with concurrent power production, preferably using ambient air, sea water, or other low-grade heat sources. Most preferably, power is generated using a multi-stage Rankine cycle in which the working fluids are expanded over at least two stages, in which the lower stage working fluid is condensed using refrigeration content of LNG, and in which the intermediate working fluid is condensed using refrigeration content of the warmed LNG and the lower stage working fluid condensate. Most typically, condensation of the working fluids is performed in a cold box.

In one aspect of the inventive subject matter, an LNG regasification and power generation system includes a cold box in which a low stage working fluid vapor is condensed using LNG and in which intermediate stage working fluid vapor is condensed using LNG and the low stage working fluid condensate, and in which the LNG feed is vaporized. Such systems will further include a first expansion turbine that is fluidly coupled to the cold box and a second expansion turbine such that the first expansion turbine provides a second portion of the intermediate stage working fluid vapor to the cold box and a first portion of the intermediate stage working fluid vapor to the second expansion turbine. Most preferably, the second expansion turbine produces the low stage working fluid vapor, and the first expansion turbine receives an intermediate stage working fluid condensate and the low stage working fluid condensate, typically as a combined stream.

Particularly contemplated systems will allow injection of the low stage working fluid condensate into the intermediate stage working fluid vapor, and will further include a heater to heat the intermediate stage working fluid condensate, the low stage working fluid condensate, and/or a first portion of the intermediate stage working fluid vapor. Most preferably, the heater will use the heat content of ambient air, seawater, or waste heat. It is still further preferred that the first expansion turbine is configured to provide the first portion of the intermediate stage working fluid vapor to the cold box at a pressure of between 50 and 250 psia, and that the second expansion turbine produces the low stage working fluid vapor at a pressure of between 5 and 50 psia. Additionally, it is generally preferred that the ratio between the first portion of the intermediate stage working fluid vapor to the second portion of the intermediate stage working fluid vapor is at least 1.1.

Therefore, a method of regasification of LNG and producing power includes a step of expanding a working fluid in a first expansion turbine to produce an intermediate pressure working fluid vapor and power and a further step of expanding a first portion of the intermediate pressure working fluid vapor in a second expansion turbine to produce a low pressure working fluid vapor and additional power. In a still further step, the low pressure working fluid vapor is condensed using refrigeration content of LNG to produce a heated LNG and a second condensate, and refrigeration content of the second condensate and the heated LNG is used to condense a second portion of the intermediate pressure working fluid vapor and to produce a first condensate and vaporized LNG. Most typically, first and second condensates are then combined to form the working fluid.

In particularly preferred methods, the first and second condensates are combined in a heat exchanger, and/or the first and second condensates are formed in respective exchangers in a cold box. It is still further preferred that at least one of the combined condensates and the first portion of the intermediate pressure working fluid vapor is heated in a heater that is most preferably heated by ambient air, seawater, or waste heat as a heat source.

Most typically, and especially where the working fluid is a hydrocarbon and/or mixed fluid the combined condensates have a pressure of between 100 and 500 psia before entering the first expansion turbine, the intermediate pressure working fluid vapor has a pressure of between 50 and 250 psia, and the low pressure working fluid vapor has a pressure of between 5 and 50 psia. Additionally, it is generally preferred that the ratio between the first portion of the intermediate pressure working fluid vapor and the second portion of the intermediate pressure working fluid vapor is at least 1.1.

Various objects, features, aspects and advantages of the present invention will become more apparent from the following detailed description of preferred embodiments of the invention.

DETAILED DESCRIPTION

The inventor has discovered that refrigeration content of LNG can be advantageously employed in the production of power in an LNG regasification facility by using a working fluid in a multi-stage Rankine cycle configuration, wherein the LNG is regasified in at least two heat exchange stages, and wherein each of the exchange stages receives expanded working fluid vapors from respective turbines or turbine stages. In particularly preferred configurations, that the intermediate-pressure working fluid is condensed using refrigeration content of both warmed LNG (produced by condensation of low-pressure working fluid) and low-pressure working fluid condensate, and that the working fluid is heated by various low temperature heating sources.

Therefore, it should be recognized that LNG regasification and power generation may be accomplished with the use of ambient air vaporizers, seawater vaporizers, and/or waste heat, and without the use of fuel gas. Moreover, such configurations will typically produce vaporized LNG suitable for pipeline transmission without the further need of a heater to increase the temperature of vaporized LNG. Contemplated methods and configurations may be used in retrofitting existing LNG regasification plants by converting existing LNG vaporizers for power generation, or may be implemented in de novo. In still further preferred aspects of the inventive subject matter, it should be appreciated that a superheater is employed to increase the working fluid vapor temperatures at the expander inlets to avoid excessive condensation at the expander outlet. Most preferably, the refrigeration content of the low-pressure working fluid is used to condense the high pressure working fluid (typically together with refrigeration content of warmed LNG), and the condensate fluids can then be mixed either internally or externally of the heat exchangers.

Figure 1:
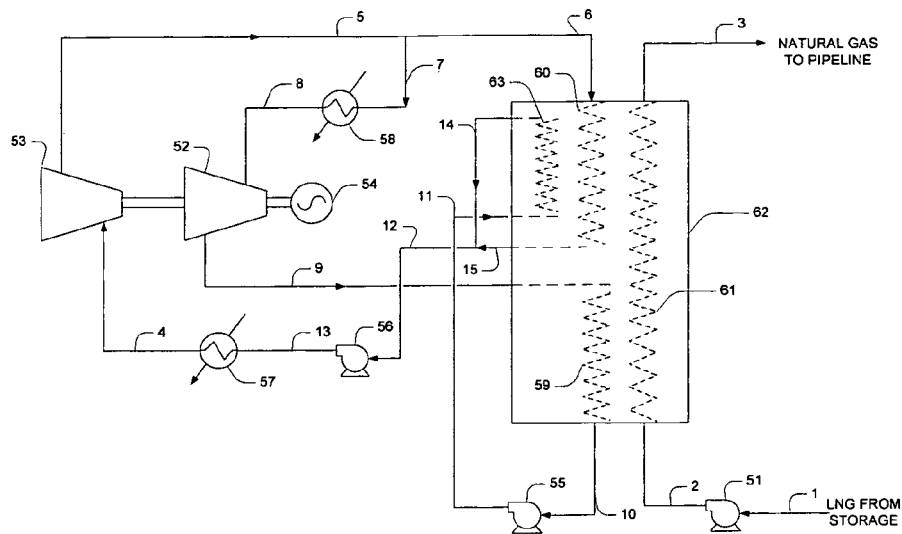
FIG. 1 is an exemplary configuration of LNG regasification with closed cycle power production with external combination of the low-pressure and intermediate-pressure working fluids.

One exemplary configuration of a multi-stage Rankine power cycle is schematically shown in FIG. 1 where both Rankine cycles are fluidly coupled to the LNG regasification plant. Of course, it should be recognized that while a two stage expansion scheme is shown here, three or more expansion stages are also applicable (not shown). It should also be noted that contemplated configurations are not limited to a specific LNG sendout rate or LNG composition, and the contemplated plants may receive higher or lower rates, with different LNG and working fluid compositions.

With further reference to FIG. 1, LNG stream 1, at a sendout rate of 500 MMscfd (from LNG storage tank or other source) is typically at a pressure of between 70 psig to 100 psig and at a temperature of about −260° F. to −250° F. Stream 1 is pumped by LNG pump 51 to suitable pressure, typically about 1200 to 1800 psig, forming pressurized LNG stream 2 as needed to meet pipeline requirements. Regasified LNG exits the cold box 62 via exchanger 61 as stream 3 at pipeline pressure and a temperature of between about 40 to 70° F. As used herein, the term "about" in conjunction with a numeral refers to a range of that numeral starting from 20% below the absolute of the numeral to 20% above the absolute of the numeral, inclusive. For example, the term "about −150° F." refers to a range of −120° F. to −180° F., and the term "about 1500 psig" refers to a range of 1200 psig to 1800 psig. The working fluid employed in the Rankine power cycle can be a pure component fluid, a multi-component fluid (e.g., hydrocarbons and/or other organics). As will be readily appreciated, the particular composition of the working fluid is generally determined by the specific composition of the import LNG, the pipeline pressure, and the desired power cycle pressures. It may also be desirable to vary the working fluid compositions and/or cycle operating pressures as necessary to maximize power generation efficiency.

High pressure liquid stream 13, at a flow rate 6,000 gpm, typically at 40° F. and 180 psia to 380 psia, is vaporized and superheated in superheater 57 to about 60° F. to 150° F. forming stream 4 that is expanded across the high pressure expander 53 to about 100 psia. Generator 54 is operationally (typically coaxially) coupled to expanders 52 and 53 to generate power. It should be noted that superheater 57 may use ambient air, seawater, or other waste heat source as suitable heat source. The expanded vapor stream 5, typically at 40° F. to 80° F., is split into two portions, stream 7 and stream 6. The split ratio (i.e., stream 7 to stream 5), typically at 0.6, will depend on the composition of the working fluid and the refrigeration content available from LNG vaporization in the heat exchanger 60. Stream 7 is heated directly or indirectly in heater 58 to about 60° F. to 90° F., forming stream 8. Again, it is generally preferred that heater 58 may employ heat from ambient air or seawater or from an intermediate heat transfer fluid (e.g., glycol water solution). The so heated vapor 8 is expanded across the low pressure expander 52 to about 18 psia forming stream 9. Stream 6 is cooled and condensed in exchanger 60 forming saturated liquid stream 15. Stream 9 is fully condensed in exchanger 59 forming stream 10, which is fed to the low-pressure pump 55.

The refrigeration content in low pressure pump discharge stream 11, typically at about −40° F. to −80° F., is used for condensation of stream 6 via heat exchanger 63 (together with warmed LNG stream in exchanger 61) forming stream 14 typically at 40° F. Stream 14 and 15 are combined to form subcooled stream 12 that is then pumped by high pressure pump 56 to about 180 psia forming stream 13. In such configuration, it should be appreciated that the power cycles generate about 10,000 kW electric power using generator 54 for an LNG plant with 500 MMscfd sendout rate.

Figure 2:
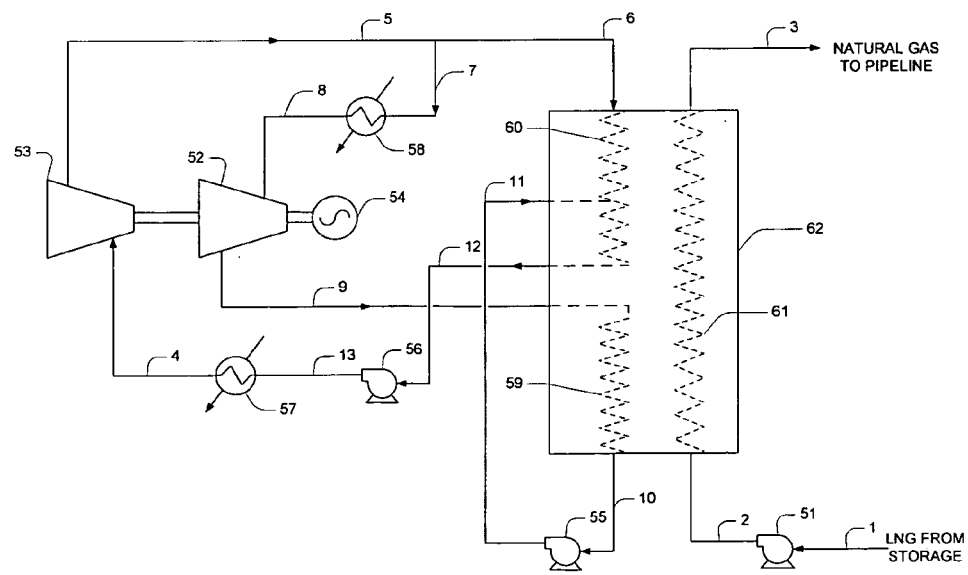
FIG. 2 is another exemplary configuration of LNG regasification with closed cycle power production with internal combination of the low-pressure and intermediate-pressure working fluids.

Alternatively, a plant may also have a configuration as shown in FIG. 2, in which like components have like numerals as compared to FIG. 1. Here, the low pressure pump discharge stream 11 is directly injected into heat exchanger 60, thus eliminating use of heat exchanger 63 of FIG. 1. In such configurations, the vapor stream 6 is partially condensed by heat transfer from stream 11 and fully condensed to subcooled stream 12 using refrigeration content of the warmed LNG in exchanger 61. With respect to suitable heat exchangers, it should be recognized that the heat exchanger type can be spiral wound heat exchangers, plate and fins heat exchangers, brazed aluminum heat exchangers, or core type exchanger suitable for new LNG regasification plants or retrofitting existing plants.

Figure 3:
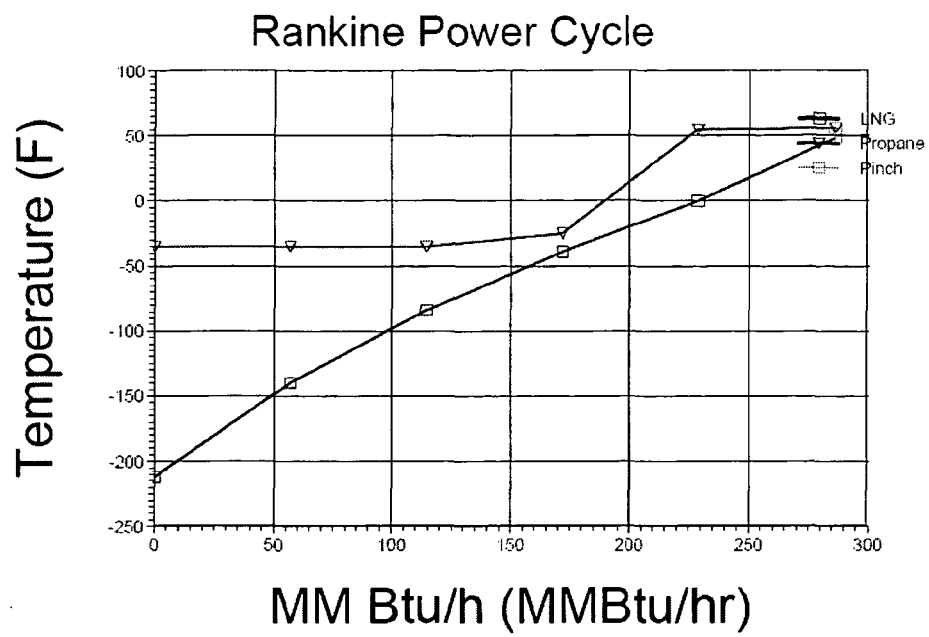
FIG. 3 is a diagram showing the composite heat curves between LNG and propane as a working fluid using a cold box.
Figure 4:
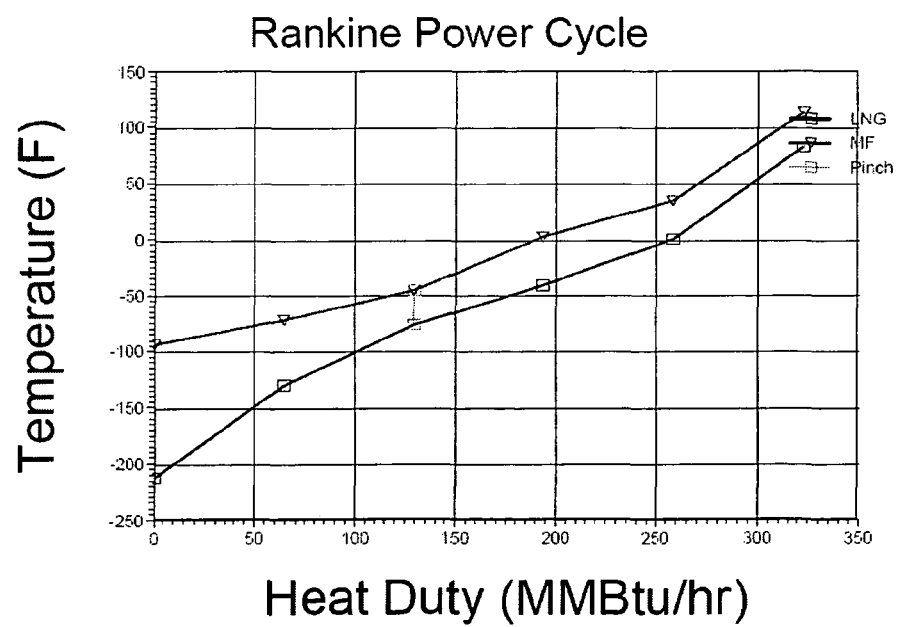
FIG. 4 is a diagram showing the composite heat curves between LNG and a mixed fluid as a working fluid using a cold box.

The composite heat curves between LNG and the different working fluids are shown in FIG. 3 (propane) and FIG. 4 (mixed fluid). As noted before, the working fluid compositions and condensation temperatures are also dependent on the power cycle operating pressures. Multiple stages (more than two stages) will further narrow the temperature gaps between the working fluids and LNG, reducing loss work and increasing power generation output and efficiency. Thus, multi-stage Rankine cycles further increase power production and efficiency, however, will require higher capital costs for the additional equipment.

Suitable heat sources for one or both exchangers especially include sea water, ambient air, power plant gas turbine exhaust, gas turbine inlet air, and cooling water to cooling towers. However, numerous alternative heat sources are also contemplated, including units found in plants other than a combined cycle plant. Similarly, suitable recipients for LNG cold may also include numerous cryogenic processes (e.g., air separation plants) in which the LNG cools the air or other gas, processes providing flue gas (e.g., combustion turbines, reformer flue gases, etc.), and other processes acting as a cold sink (e.g., carbon dioxide liquid production plants, desalination plants, or food freezing facilities).

In further contemplated aspects of the inventive subject matter, it is generally preferred that power production is operationally coupled with LNG regasification facilities and/or LNG receiving terminals, and particularly preferred configurations include those in which LNG is regasified in a process in which at least part of the LNG cold is used to generate electric power. Exemplary suitable configurations are described in our commonly owned and co-pending international patent applications with the serial numbers PCT/US03/25372 (published as WO 2004/109206 A1) and PCT/US03/26805 (published as WO 2004/109180 A1), which are incorporated by reference herein.

Consequently, and depending on the particular heat source, it should be recognized that the energy needed for regasification of the LNG may be entirely, or only partially provided by heat rejection from the contemplated Rankine cycle. Where the heat source provides insufficient quantities of heat to vaporize and superheat the working fluids, it should be recognized that supplemental heat may be provided. Suitable supplemental heat sources include waste heat from the steam turbine discharge, condensation duty from the flue gas, ambient heating with air (e.g., by providing air conditioning to buildings), with seawater, or fuel gas. Consequently, it should be appreciated that contemplated configuration and processes may be used to retrofit existing regasification plants for internal consumption or to improve power generation efficiencies and flexibility, or may be used in new installations.

Therefore, it should be appreciated that numerous advantages may be achieved using configurations according to the inventive subject matter. Among other things, contemplated configurations eliminate seawater LNG vaporization by using a working fluid, such as propane or hydrocarbons or other mixture that is different than LNG. The systems and processes contemplated herein can be used independently for power production, or coupled with any type of power plant while still providing benefit or improved efficiency. Especially preferred configurations utilize the LNG cold in multi-stage Rankine cycle using pure component or multi-components as the working fluid to achieve high thermal efficiency, while LNG sendout is pumped to supercritical pressure and regasified using heat rejection from the working fluid. The working fluid is pumped, superheated, and expanded to lower pressure thereby generating power, wherein the expanded working fluid is condensed utilizing the refrigerant content of LNG sendout. It should be recognized that the power generation configurations according to the inventive subject matter may be implemented as a retrofit to an existing LNG facility or implemented in a grass root facility.

Thus, specific embodiments and applications for configurations and methods for power generation with integrated LNG regasification have been disclosed. It should be apparent, however, to those skilled in the art that many more modifications besides those already described are possible without departing from the inventive concepts herein. The inventive subject matter, therefore, is not to be restricted except in the spirit of the present disclosure. Moreover, in interpreting the specification and contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A method of regasification of LNG and producing power, the method comprising:

expanding a working fluid in a first expansion turbine to produce an intermediate pressure working fluid vapor and power;

expanding a first portion of the intermediate pressure working fluid vapor in a second expansion turbine to produce a low pressure working fluid vapor and additional power;

condensing the low pressure working fluid vapor using refrigeration content of to produce a heated LNG and a second condensate;

using refrigeration content of the second condensate and using refrigeration content of the heated LNG to condense a remainder of the intermediate pressure working fluid vapor and to produce a first condensate and vaporized LNG; and combining the first and second condensates to form the working fluid.

2. The method of claim 1 wherein the step of combining the first and second condensates is performed in a heat exchanger.

3. The method of claim 1 wherein the first and second condensates are formed in respective exchangers in a cold box.

4. The method of claim 1 further comprising heating at least one of the combined condensates and the first portion of the intermediate pressure working fluid vapor.

5. The method of claim 4 wherein the step of heating uses ambient air, seawater, or waste heat as a heat source.

6. The method of claim 1 wherein the combined condensates have a pressure of between 100 and 500 psia before entering the first expansion turbine, wherein the intermediate pressure working fluid vapor has a pressure of between 50 and 250 psia, and wherein the low pressure working fluid vapor has a pressure of between 5 and 50 psia.

7. The method of claim 1 wherein a ratio between the first portion of the intermediate pressure working fluid vapor and the second portion of the intermediate pressure working fluid vapor is at least 1.1.

8. The method of claim 1 wherein the working fluid comprises a hydrocarbon.

9. The method of claim 1 wherein the LNG is regasified at a rate of 500 mM scfd.

10. An LNG regasification and power generation system, the system comprising:

a cold box that is configured to allow condensation of a low stage working fluid vapor using LNG to thereby produce heated LNG and to allow condensation of intermediate stage working fluid vapor using the heated LNG and low stage working fluid condensate, and wherein the cold box is further configured to allow vaporization of the LNG using heat content of the intermediate stage working fluid vapor and heat content of the low stage working fluid vapor;

a first expansion turbine fluidly coupled to the cold box and a second expansion turbine such that the first expansion turbine provides a second portion of the intermediate stage working fluid vapor to the cold box and a first portion of the intermediate stage working fluid vapor to the second expansion turbine;

wherein the second expansion turbine is configured to produce the low stage working fluid vapor; and wherein the first expansion turbine is configured to receive an intermediate stage working fluid condensate and the low stage working fluid condensate.

11. The system of claim 10 wherein the cold box is configured to allow injection of the low stage working fluid condensate into the intermediate stage working fluid vapor.

12. The system of claim 10 further comprising a heater that is configured to allow heating of the intermediate stage working fluid condensate, the low stage working fluid condensate, or a first portion of the intermediate stage working fluid vapor.

13. The system of claim 12 wherein the heater is configured to use heat content of ambient air, seawater, or waste heat to heat the intermediate stage working fluid condensate, the tow stage working fluid condensate, or a first portion of the intermediate stage working fluid vapor.

14. The system of claim 10 wherein the first expansion turbine is configured to provide the first portion of the intermediate stage working fluid vapor to the cold box at a pressure of between 50 and 250 psia, and wherein the second expansion turbine is configured to produce the low stage working fluid vapor at a pressure of between 5 and 50 psia.

15. The system of claim 10 wherein a ratio of the first portion of the intermediate stage working fluid vapor to the second portion of the intermediate stage working fluid vapor is at least 1.1.

* * * * *